US012597590B2

(12) United States Patent
Kishimoto et al.

(10) Patent No.: US 12,597,590 B2
(45) Date of Patent: Apr. 7, 2026

(54) PRODUCING METHOD FOR POSITIVE ELECTRODE PLATE

(71) Applicants:Prime Planet Energy & Solutions, Inc., Tokyo (JP); PRIMEARTH EV ENERGY CO., LTD., Shizuoka-ken (JP); TOYOTA JIDOSHA KABUSHIKI KAISHA, Aichi-ken (JP)

(72) Inventors: Naoya Kishimoto, Nagoya (JP); Shotaro Deguchi, Toyohashi (JP)

(73) Assignees: PRIME PLANET ENERGY & SOLUTIONS, INC., Tokyo (JP); TOYOTA BATTERY CO., LTD., Shizuoka-ken (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 529 days.

(21) Appl. No.: 18/173,063

(22) Filed: Feb. 23, 2023

(65) Prior Publication Data

US 2023/0343922 A1 Oct. 26, 2023

(30) Foreign Application Priority Data

Apr. 20, 2022 (JP) ................................. 2022-069619

(51) Int. Cl.
*H01M 4/139* (2010.01)
*H01M 4/04* (2006.01)
*H01M 4/02* (2006.01)

(52) U.S. Cl.
CPC .... *H01M 4/0416* (2013.01); *H01M 2004/028* (2013.01)

(58) Field of Classification Search
CPC ............................ H01M 4/625; H01M 4/0416
See application file for complete search history.

(56) References Cited

U.S. PATENT DOCUMENTS 12,451,492 B2 10/2025 Kishimoto et al.
2019/0036186 A1* 1/2019 Kim ................... H01M 4/8867
(Continued)

FOREIGN PATENT DOCUMENTS

CN 113725399 A 11/2021
JP 2008-198596 A 8/2008
(Continued)

OTHER PUBLICATIONS

Notice of Allowance in U.S. Appl. No. 18/185,373, mailed Aug. 29, 2025, 42pp.

*Primary Examiner* — Nicholas A Smith
*Assistant Examiner* — Zackary Richard Cochenour
(74) *Attorney, Agent, or Firm* — HAUPTMAN HAM, LLP

(57) ABSTRACT

A producing method for a positive electrode plate includes a second coating process of coating a second positive electrode paste on either a surface of a first positive electrode paste layer which is formed on a current collector or a surface of a positive electrode mixture layer that has been formed by drying the first positive electrode paste layer, a drying process of drying the first positive electrode paste layer with the second positive electrode paste layer or a drying process having a first step of drying the first positive electrode paste layer to form the first positive electrode mixture layer and a second step of drying the second positive electrode paste layer coated on the surface of the first positive electrode mixture layer to form the positive electrode mixture layer. An average length of first carbon nanotubes is longer than an average length of second carbon nanotubes.

7 Claims, 10 Drawing Sheets

(56)                    References Cited

U.S. PATENT DOCUMENTS

| | | |
|---|---|---|
| 2020/0058930 A1 | 2/2020 | Otohata et al. |
| 2021/0399284 A1 | 12/2021 | Toshiro et al. |
| 2022/0037661 A1* | 2/2022 | Moriya ................. H01M 4/587 |
| 2023/0327083 A1* | 10/2023 | Lai ........................ H01M 4/505 |
| | | 429/217 |

FOREIGN PATENT DOCUMENTS

| | | |
|---|---|---|
| JP | 2019-185943 A | 10/2019 |
| JP | 2020184490 A | 11/2020 |
| JP | 2022055888 A | 4/2022 |
| JP | 2022055890 A | 4/2022 |
| WO | 2018/186017 A1 | 10/2018 |
| WO | 2020/100620 A1 | 5/2020 |

* cited by examiner

ELECTRICAL RESISTIVITY ($\Omega \cdot cm$)

EXAMPLE 1    EXAMPLE 2    COMP. EXAMPLE 1    COMP. EXAMPLE 2

PRODUCING METHOD FOR POSITIVE ELECTRODE PLATE

CROSS-REFERENCE TO RELATED APPLICATIONS

This application is based upon and claims the benefit of priority from the prior Japanese Patent Application No. 2022-069619, filed Apr. 20, 2022, the entire contents of which are incorporated herein by reference.

BACKGROUND

Technical Field

The present disclosure relates to a producing method for a positive electrode plate.

Related Art

The Japanese patent application publication No. JP2020-184490A has disclosed a producing method for a positive electrode plate including a positive electrode mixture layer placed on a surface of a current collector. Specifically, this producing method includes a positive electrode paste preparing process of preparing a positive electrode paste including carbon nanotubes, positive active material particles, and a solvent, a coating process of coating the positive electrode paste on the surface of the current collector to form a positive electrode paste layer on the surface of the current collector, and a drying process of drying the positive electrode paste layer to form the positive electrode mixture layer.

SUMMARY

Technical Problems

Additionally, when the positive electrode paste including the carbon nanotubes, the positive active material particles, and the solvent is coated on the surface of the current collector to form the positive electrode paste layer and this positive electrode paste layer is dried, there is a case that a part of the carbon nanotubes disposed on a side of a current collector inside the positive electrode paste layer moves to a side of the surface of the positive electrode paste layer with the solvent (to a side far away from the current collector), which results in reduction in an amount of the carbon nanotubes on the current collector side. The carbon nanotube is lighter in its weight than the positive active material particle, and therefore the carbon nanotubes tend to move to the surface side of the positive electrode paste layer with the solvent that is to be evaporated. As a result of this, inside the positive electrode mixture layer which is formed by drying the positive electrode paste layer, reduction in conductive paths on the current collector side causes increase in the electrical resistivity of the positive electrode plate in a thickwise direction, which could cause degradation in current collecting performance of the positive electrode plate.

The present disclosure has been made in view of the above circumstances, and has a purpose of providing a producing method for the positive electrode plate which has small electrical resistivity in the thickwise direction.

Means of Solving the Problem (1) One aspect of the present disclosure is a producing method for a positive electrode plate comprising a positive electrode mixture layer on a surface of a current collector includes: first-positive-electrode-paste preparing of preparing a first positive electrode paste including first carbon nanotubes, positive active material particles, and a solvent; second-positive-electrode-paste preparing of preparing a second positive electrode paste including second carbon nanotubes, the positive active material particles, and the solvent; first coating of coating the first positive electrode paste on the surface of the current collector to form a first positive electrode paste layer on the surface of the current collector; second coating of coating the second positive electrode paste on any one of a surface of the first positive electrode paste layer and a surface of a first positive electrode mixture layer which is formed by drying the first positive electrode paste layer; and any one of drying the first positive electrode paste layer and the second positive electrode paste layer after the second coating to form the positive electrode mixture layer and drying including steps of first drying to dry the first positive electrode paste layer before the second coating to form the first positive electrode mixture layer and second drying to dry the second positive electrode paste layer, which has been coated on the surface of the first positive electrode mixture layer, to form the positive electrode mixture layer, wherein an average length of the first carbon nanotubes is longer than an average length of the second carbon nanotubes.

In the above-mentioned producing method, either one of the following processes of (a) and (b) is performed. (a) After the first positive electrode paste is coated on the surface of the current collector and the first positive electrode paste layer is formed on the surface of the current collector in the first coating, the second positive electrode paste is coated on the surface of the first positive electrode paste layer to form the second positive electrode paste layer in the second coating. Thereafter, in the drying, the first positive electrode paste layer is dried with the second positive electrode paste layer.

(b) After the first positive electrode paste is coated on the surface of the current collector and the first positive electrode paste layer is formed on the surface of the current collector in the first coating, the step of first drying is performed such that the first positive electrode paste layer is dried to form the first positive electrode mixture layer. Subsequently, after the second positive electrode paste is coated on the surface of the first positive electrode mixture layer and the second positive electrode paste layer is formed in the second coating, the step of second drying is performed to dry the second positive electrode paste layer.

In the above-mentioned producing method, the average length of the first carbon nanotubes included in the first positive electrode paste is made to be longer than the average length of the second carbon nanotubes included in the second positive electrode paste. Thus, when the first positive electrode paste layer is dried, the first carbon nanotubes which are disposed on the current collector side in the first positive electrode paste layer are hard to move toward the surface side (the side far away from the current collector) with the solvent, so that the number of the carbon nanotubes positioned on the current collector side, especially, the carbon nanotubes contacted with the current collector, rarely decreases.

This is because when the first positive electrode paste layer is dried, the first carbon nanotubes in the first positive electrode paste layer tend to move toward the surface with the solvent that is to be evaporated, but the first carbon nanotubes are easily caught up by the positive active material particles due to their long length, and thereby the carbon nanotubes are hard to move toward the surface side owing to this catching by the positive active material particles. Therefore, according to the above-mentioned producing method, a positive electrode plate having low electrical resistivity (Ω·cm) in the thickwise direction can be produced.

(2) Further, in the producing method for the positive electrode plate according to the above-mentioned (1), preferably, the second coating includes coating the second positive electrode paste on a surface of the first positive electrode paste layer to form the second positive electrode paste layer, and the drying is to dry the first positive electrode paste layer with the second positive electrode paste layer.

In the above-mentioned producing method, the second positive electrode paste is coated on the surface of the first positive electrode paste layer before drying in the second coating, and thereafter, the second positive electrode paste layer is dried with the first positive electrode paste layer in the drying. Thus, in comparison with a case of "drying the first positive electrode paste layer before coating the second positive electrode paste to form the first positive electrode mixture layer, and then drying the second positive electrode paste layer that has been coated on the surface of the first positive electrode mixture layer," the electrical resistivity of the positive electrode plate in the thickwise direction can be lowered furthermore.

The reason for the above is explained below. According to the latter producing method, when the second positive electrode paste layer is dried, a part of the second carbon nanotubes positioned on the current collector side in the second positive electrode paste layer moves to the surface side with the solvent, so that there is a possibility that the number of the second carbon nanotubes on the current collector side could be reduced in the second positive electrode paste layer. In the latter producing method, at the time when the second positive electrode paste layer is to be dried, the first positive electrode paste layer has already been dried to become the first positive electrode mixture layer, and thus the first carbon nanotubes in the first positive electrode mixture layer do not move into the second positive electrode paste layer.

On the other hand, in the former producing method, the second positive electrode paste layer is dried with the first positive electrode paste layer, and accordingly, in drying these layers, a part of the second carbon nanotubes positioned on the current collector side in the second positive electrode paste layer moves to the surface side with the solvent. Thereby, the second carbon nanotubes on the current collector side in the second positive electrode paste layer could be reduced. On the other hand, a part of the first carbon nanotubes positioned on the surface side in the first positive electrode paste layer moves to the surface side with the solvent, so that the part of the first carbon nanotubes may be disposed on the current collector side in the second positive electrode paste layer. Alternatively, the part of the first carbon nanotubes may be disposed as bridging over the surface side of the first positive electrode paste layer and the current collector side of the second positive electrode paste layer. Thereby, the carbon nanotubes are disposed appropriately on the current collector side in the second positive electrode paste layer, and thus the electrical resistivity of the positive electrode plate in the thickwise direction can further be made low.

DETAILED DESCRIPTION OF THE EXEMPLARY EMBODIMENTS

Example 1

Figure 1:
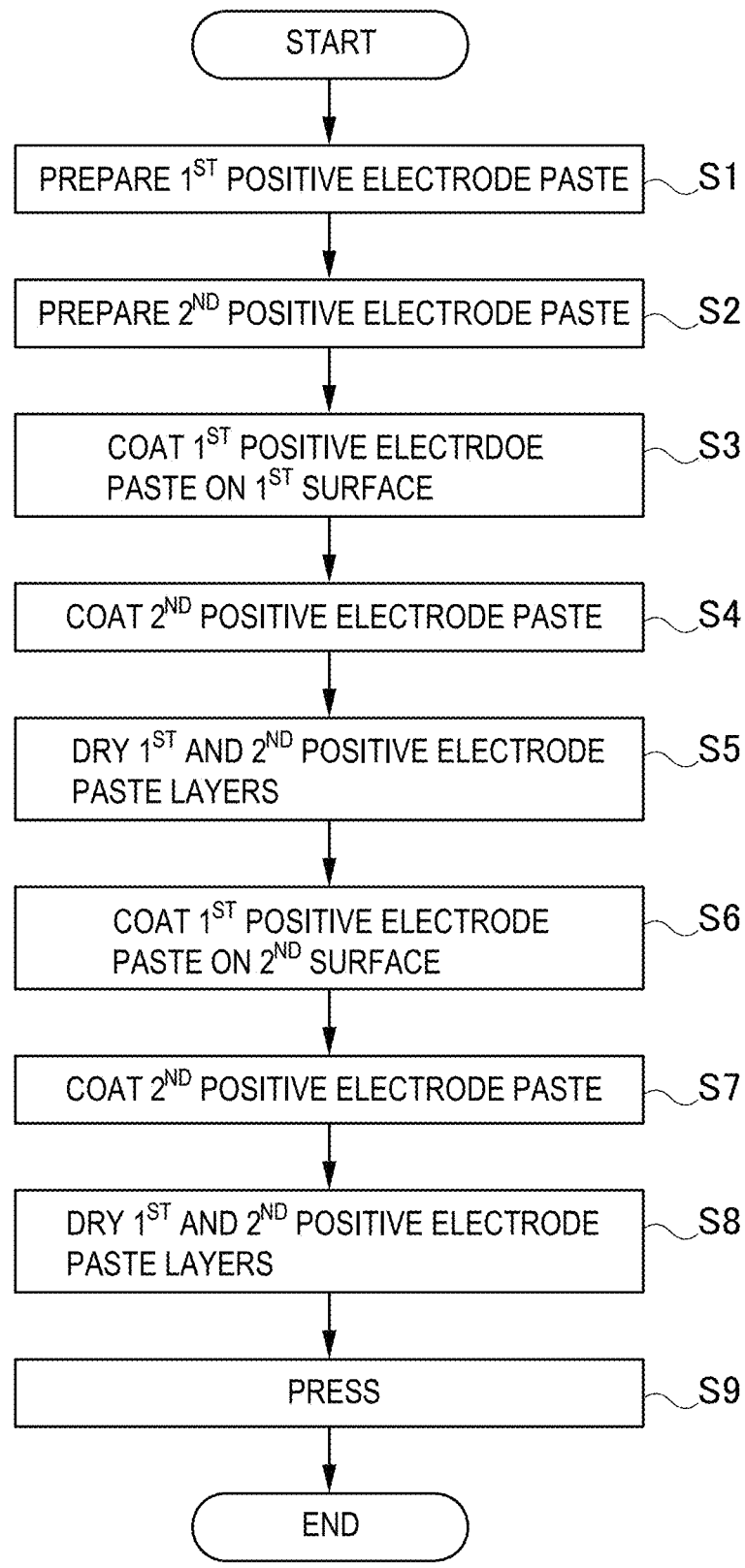
FIG. 1 is a flow chart indicating steps of a producing method for a positive electrode plate in an example 1.

A producing method for a positive electrode plate according to an example 1 is now explained. FIG. 1 is a flow chart indicating steps of the producing method for a positive electrode plate 1 according to the example 1. Firstly, in step S1 of a first positive electrode paste preparing process, a first positive electrode paste 41 including first carbon nanotubes 11, positive active material particles 15, a binder (not shown), and a solvent 17 is prepared (see FIG. 2). The first positive electrode paste 41 includes only the first carbon nanotubes 11 as a carbon nanotube. Further, in step S2 of a second positive electrode paste preparing process, a second positive electrode paste 42 including second carbon nanotubes 12, the positive active material particles 15, the binder (not shown), and the solvent 17 is prepared (see FIG. 3). The second positive electrode paste 42 includes only the second carbon nanotubes 12 as the carbon nanotube.

An average length of the first carbon nanotubes 11 is longer than an average length of the second carbon nanotubes 12. Specifically, the average length of the first carbon nanotubes 11 is 1.3 and the average length of the second carbon nanotubes 12 is 0.6 μm. In detail, the length of the respective first carbon nanotubes 11 is arranged to be within a range of 1.0 μm to 3.0 μm inclusive while the length of the respective second carbon nanotubes 12 is arranged to be within a range of 0.3 μm to 0.8 μm inclusive.

Figure 4:
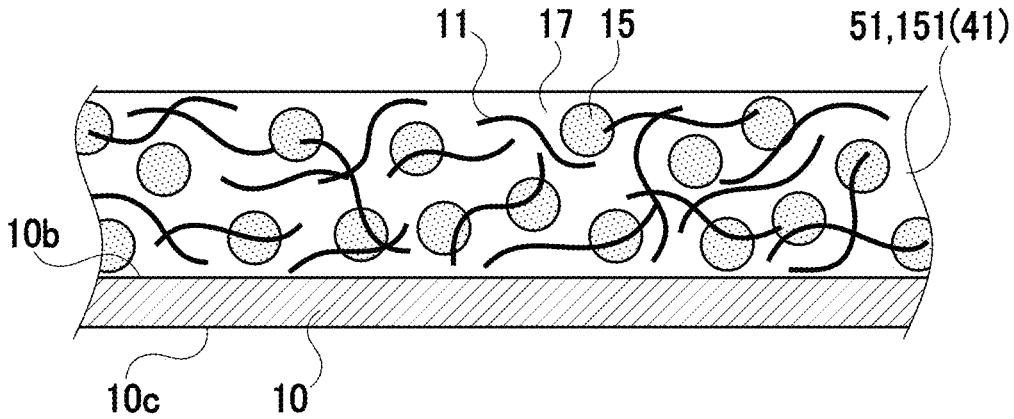
FIG. 4 is an explanatory view of a first coating process in the examples 1 and 2.
Figure 5:
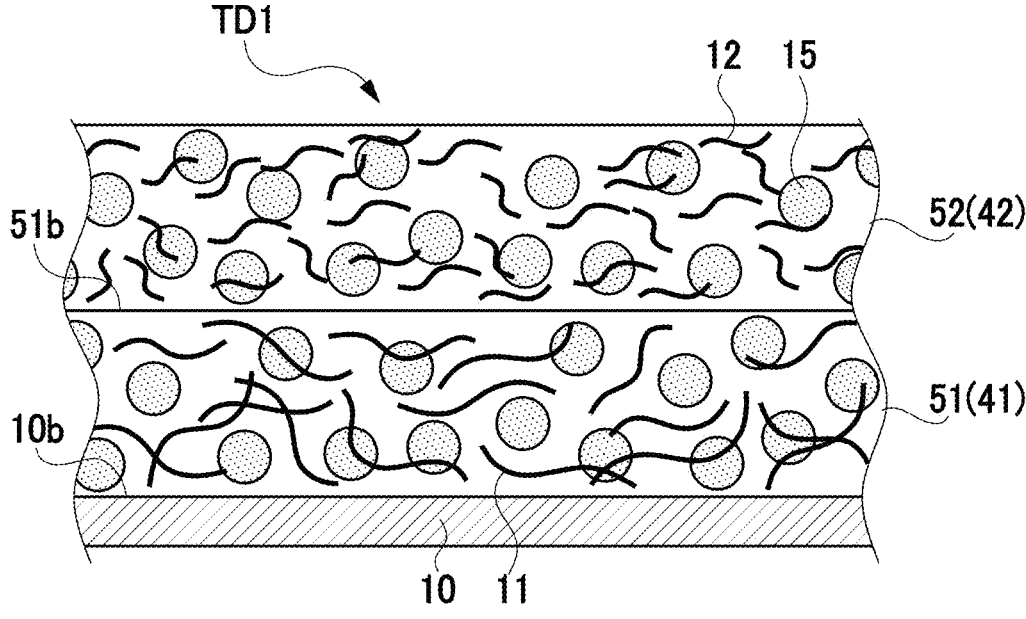
FIG. 5 is an explanatory view of a second coating process in the example 1.

Subsequently, in step S3 of a first coating process, the first positive electrode paste 41 is coated on a first surface 10b of a current collector 10 to form a first positive electrode paste layer 51 on the first surface 10b of the current collector 10 (see FIG. 4). In the present example 1, an aluminum foil having the first surface 10b and a second surface 10c is used as the current collector 10. Subsequently, the process proceeds to step S4 of a second coating process, and a second positive electrode paste 42 is coated on a surface 51b of the first positive electrode paste layer 51 to form a second positive electrode paste layer 52 (see FIG. 5). In this manner, a to-be-dried object TD1, which includes the first positive electrode paste layer 51 on the surface 10*b* of the current collector 10 and the second positive electrode paste layer 52 on the surface 51*b* of the first positive electrode paste layer 51, is produced.

Figure 6:
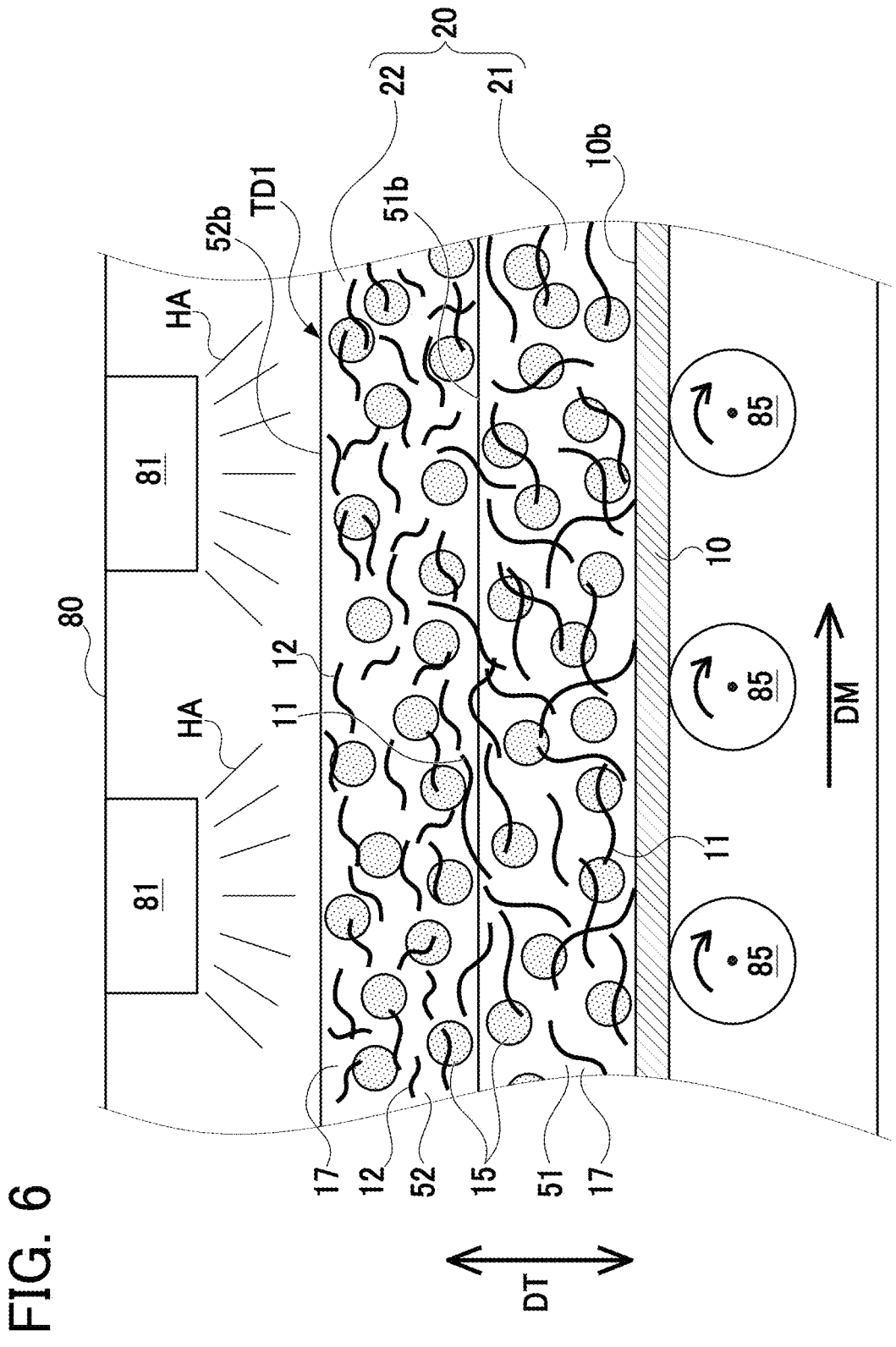
FIG. 6 is an explanatory view of a drying process in the example 1.

Thereafter, in step S5 of a drying process, the first positive electrode paste layer 51 is dried with the second positive electrode paste layer 52 to form a positive electrode mixture layer 20. Specifically, as shown in FIG. 6, the first positive electrode paste layer 51 and the second positive electrode paste layer 52 of the to-be-dried object TD1 are dried by a drying furnace 80 which is provided with a plurality of hot air blowers 81 placed on an upper side and a plurality of feeding rollers 85 placed on a lower side. To be more specific, in a state where the second positive electrode paste layer 52 is directed to a side of the hot air blowers 81 positioned on the upper side, the first positive electrode paste layer 51 and the second positive electrode paste layer 52 are dried by hot air HA blown out of the hot air blowers 81 while the to-be-dried object TD1 is being conveyed in a feeding direction DM by the feeding rollers 85.

At this time, the solvent 17 included in both the first positive electrode paste layer 51 and the second positive electrode paste layer 52 moves to the surface 52*b* of the second positive electrode paste layer 52 and is evaporated. As a result of this, the first positive electrode paste layer 51 becomes a first positive electrode mixture layer 21 and the second positive electrode paste layer 52 becomes a second positive electrode mixture layer 22. In this manner, a positive electrode mixture layer 20 formed of the first positive electrode mixture layer 21 and the second positive electrode mixture layer 22 is formed on the first surface 10*b* of the current collector 10.

Thereafter, on the second surface 10*c* of the current collector 10, too, the positive electrode mixture layer 20 formed of the first positive electrode mixture layer 21 and the second positive electrode mixture layer 22 is formed. To be specific, in step S6 of the first coating process, the first positive electrode paste 41 is coated on the second surface 10*c* of the current collector 10 to form the first positive electrode paste layer 51 on the second surface 10*c* of the current collector 10. Subsequently, the process proceeds to step S7 of the second coating process, and the second positive electrode paste 42 is coated on the surface 51*b* of the first positive electrode paste layer 51 to form the second positive electrode paste layer 52.

Figure 7:
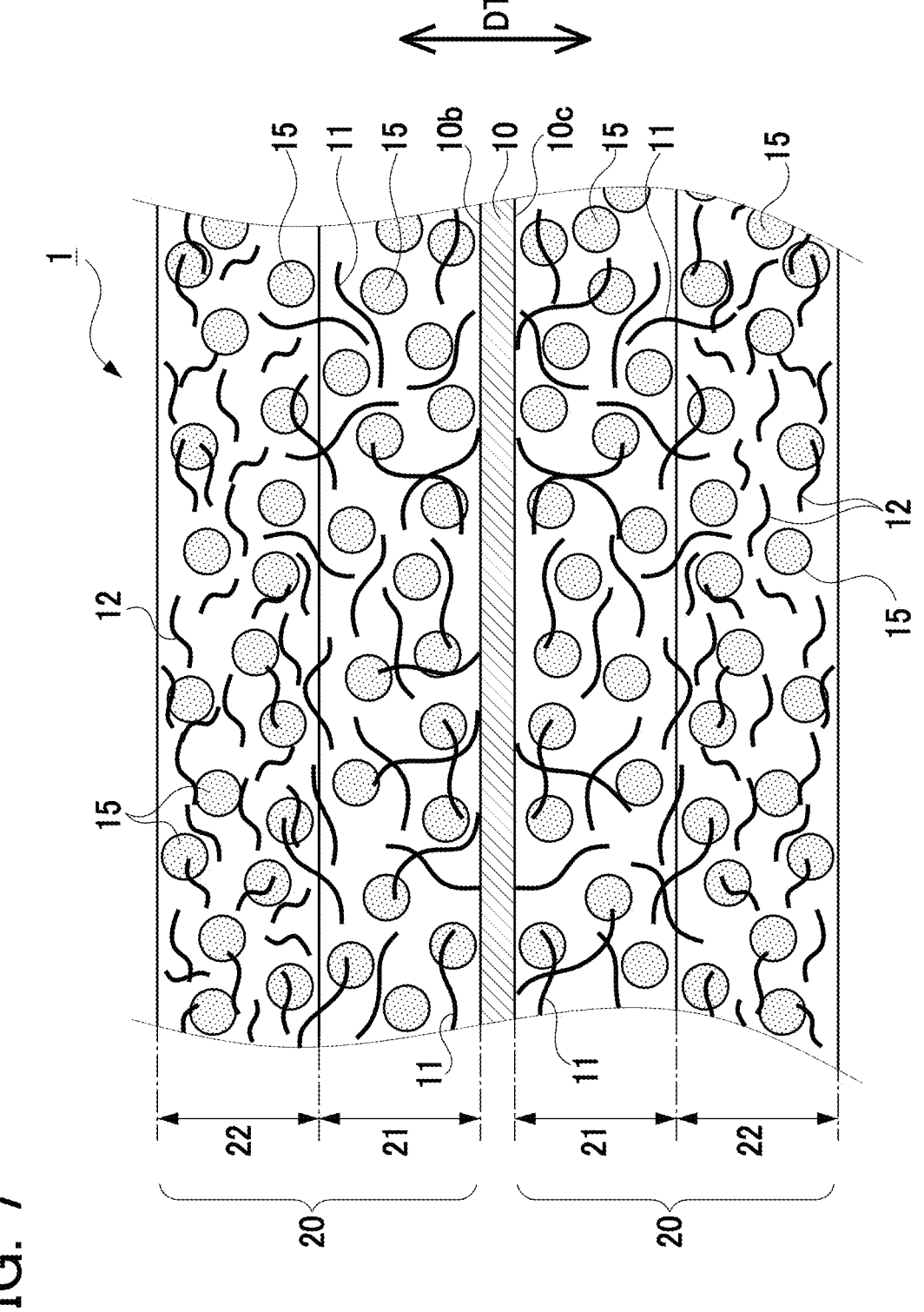
FIG. 7 is a schematic sectional view of the positive electrode plate in the example 1.

Subsequently, in step S8 of a drying process, the first positive electrode paste layer 51 is dried with the second positive electrode paste layer 52 by the drying furnace 80 to form the positive electrode mixture layer 20. At this time, the solvent 17 included in both the first positive electrode paste layer 51 and the second positive electrode paste layer 52 moves to the surface 52*b* of the second positive electrode paste layer 52 and is evaporated. As a result of this, the first positive electrode paste layer 51 becomes the first positive electrode mixture layer 21 and the second positive electrode paste layer 52 becomes the second positive electrode mixture layer 22, so that the positive electrode mixture layer 20 formed of the first positive electrode mixture layer 21 and the second positive electrode mixture layer 22 is also formed on the second surface 10*c* of the current collector 10 (see FIG. 7). Thereby, the positive electrode plate 1 (that is, the positive electrode plate 1 before pressing) provided with the positive electrode mixture layers 20 on both surfaces (that is, the first surface 10*b* and the second surface 10*c*) of the current collector 10 is obtained. Thereafter, in step S9 of a press process, the positive electrode plate 1 is pressed in the thickwise direction DT to compress the positive electrode mixture layers 20 in the thickwise direction DT, thus completing the positive electrode plate 1 (see FIG. 7).

Heretofore, there has been a case in which, when a positive electrode paste including carbon nanotubes, positive active material particles, and a solvent is coated on a surface of a current collector to form a positive electrode paste layer and this positive electrode paste layer is to be dried, a part of the carbon nanotubes positioned on a side of the current collector in the positive electrode paste layer moves to a side of the surface of the positive electrode paste layer (that is, a side far away from the current collector) with the solvent, which could cause reduction in an amount of the carbon nanotubes on the current collector side. This is because the carbon nanotubes are light in their weight as compared to the positive active material particles, and therefore the carbon nanotubes tend to move toward the surface side of the positive electrode paste layer with the solvent that is to be evaporated. Accordingly, the number of conductive paths on the current collector side decreases in the positive electrode mixture layer in which the positive electrode paste layer has been dried, causing increase in the electrical resistivity of the positive electrode plate in the thickwise direction. This could result in degradation in the current collecting performance of the positive electrode plate.

To address the above, in the present example 1, the average length of the first carbon nanotubes 11 included in the first positive electrode paste 41 is arranged to be longer than the average length of the second carbon nanotubes 12 included in the second positive electrode paste 42. Thereby, in steps S5 and S8 of the drying process, the first carbon nanotubes 11 positioned on the current collector 10 side in the first positive electrode paste layer 51 are hard to move to the surface 51*b* side (that is, a side far away from the current collector 10 or the upper side in FIG. 6) with the solvent 17 while the first positive electrode paste layer 51 is being dried, so that the first carbon nanotubes 11 positioned on the current collector 10 side, especially the ones contacted with the current collector 10, are rarely reduced.

This is because when the first positive electrode paste layer 51 is to be dried, the first carbon nanotubes 11 in the first positive electrode paste layer 51 tend to move toward the surface 51*b* side and the surface 52*b* side with the to-be-evaporated solvent 17, but the first carbon nanotubes 11 having the long length are easily caught or hooked on the positive active material particles 15, and thereby the first carbon nanotubes 11 are hard to move to the surface 51*b* side and the surface 52*b* side owing to this catching by the positive active material particles 15.

Further, in the present example 1, viscosity of the first positive electrode paste 41 is arranged to be higher than that of the second positive electrode paste 42. Thus, in steps S5 and S8 of the drying process, the first carbon nanotubes 11 positioned on the current collector 10 side in the first positive electrode paste layer 51 are further hard to move to the surface 51*b* side (that is, the side spaced apart from the current collector 10 or the upper side in FIG. 6) while the first positive electrode paste layer 51 is being dried.

Therefore, according to the producing method of the present example 1, it is possible to prevent decrease in the conductive paths on the current collector 10 side in the first positive electrode mixture layer 21 in which the first positive electrode paste layer 51 has been dried. Thereby, increase in the electrical resistivity of the positive electrode plate 1 in the thickwise direction DT can be prevented, so that degradation in the current collecting performance of the positive electrode plate 1 can be prevented. According to the producing method of the present example 1, therefore, it is possible to produce the positive electrode plate 1 having small electrical resistivity (Ω·cm) in the thickwise direction DT.

Example 2

Figure 8:
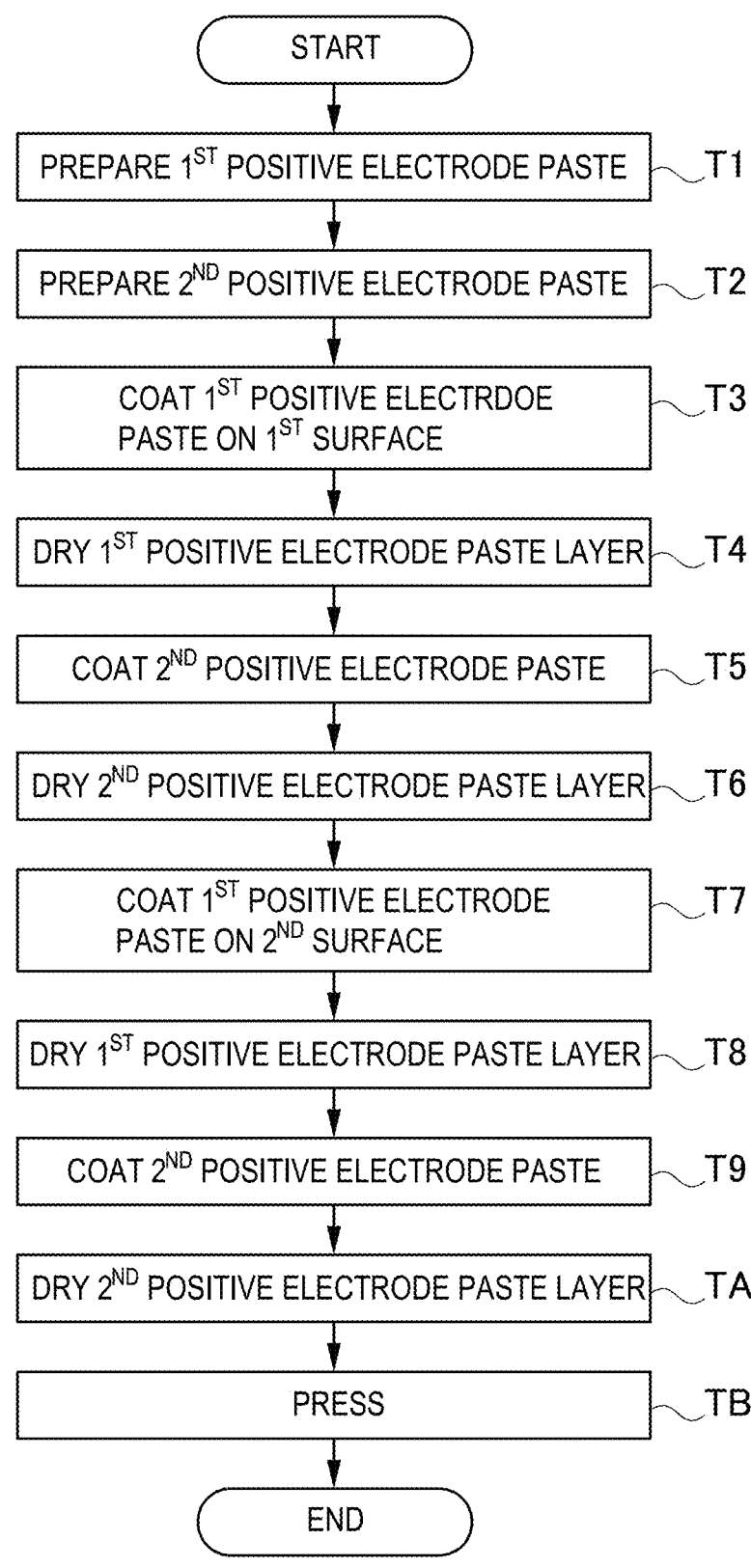
FIG. 8 is a flow chart indicating steps of the producing method for the positive electrode plate in the example 2.

In comparing with the producing method of the example 1, a producing method of an example 2 is different in a manner that a first positive electrode paste layer 151 is dried to form a first positive electrode mixture layer 121, and thereafter, a second positive electrode paste 42 is coated on a surface 121*b* of the first positive electrode mixture layer 121 while other configurations are same as the example 1. The producing method for the positive electrode plate in the example 2 is explained below. FIG. 8 is a flow chart indicating steps of the producing method for a positive electrode plate 101 according to the example 2.

Figure 2:
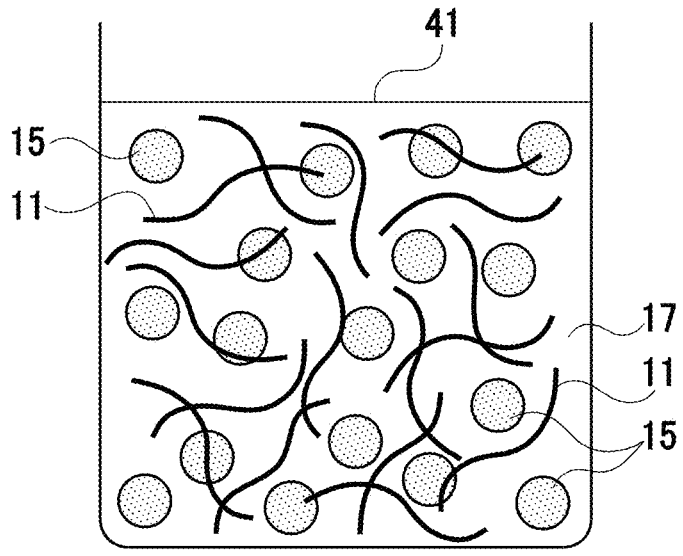
FIG. 2 is an explanatory view of a first positive electrode paste preparing process in examples 1 and 2.
Figure 3:
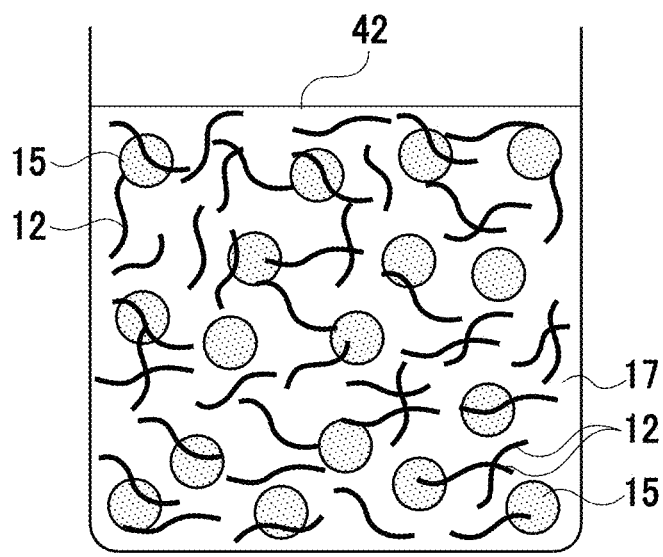
FIG. 3 is an explanatory view of a second positive electrode paste preparing process in the examples 1 and 2.
Figure 9:
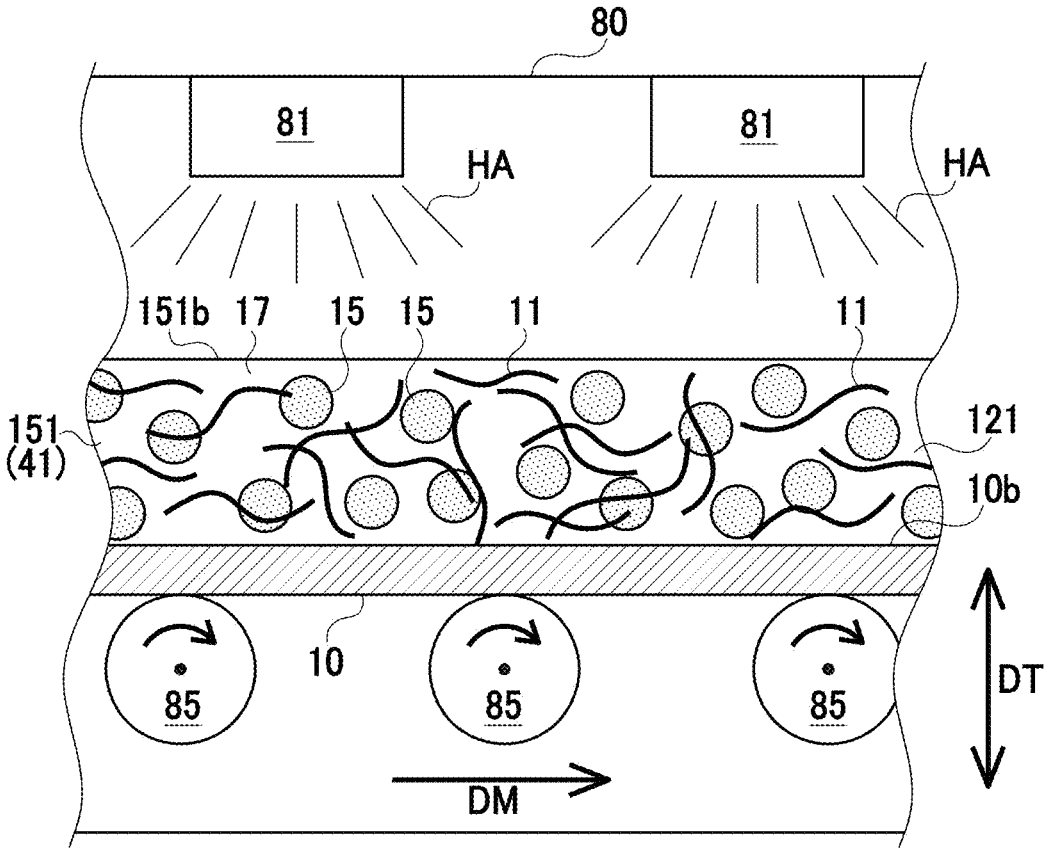
FIG. 9 is an explanatory view of a first drying step in the drying process in the example 2

Firstly, in step T1 of a first positive electrode paste preparing process, the first positive electrode paste 41 similar to the one in the example 1 is prepared (see FIG. 2). Further, in step T2 of a second positive electrode paste preparing process, the second positive electrode paste 42 similar to the one in the example 1 is prepared (see FIG. 3). Subsequently, in step T3 of a first coating process, the first positive electrode paste 41 is coated on the first surface 10*b* of the current collector 10 to form a first positive electrode paste layer 151 on the first surface 10*b* of the current collector 10 (see FIG. 4). Subsequently, in step T4 of a first drying, the first positive electrode paste layer 151 is dried by use of the drying furnace 80 to form a first positive electrode mixture layer 121 (see FIG. 9).

Figure 10:
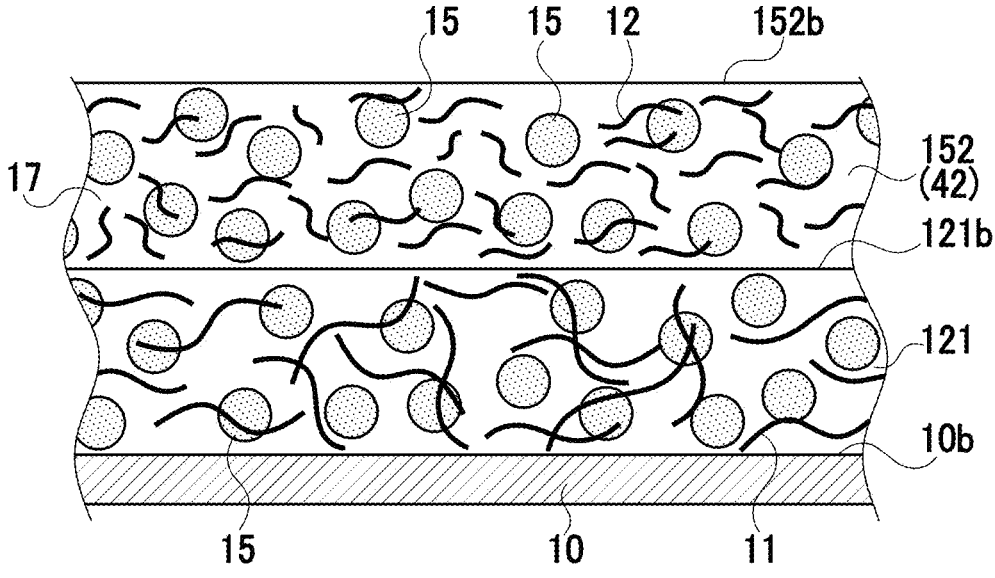
FIG. 10 is an explanatory view of the second coating process in the example 2.
Figure 11:
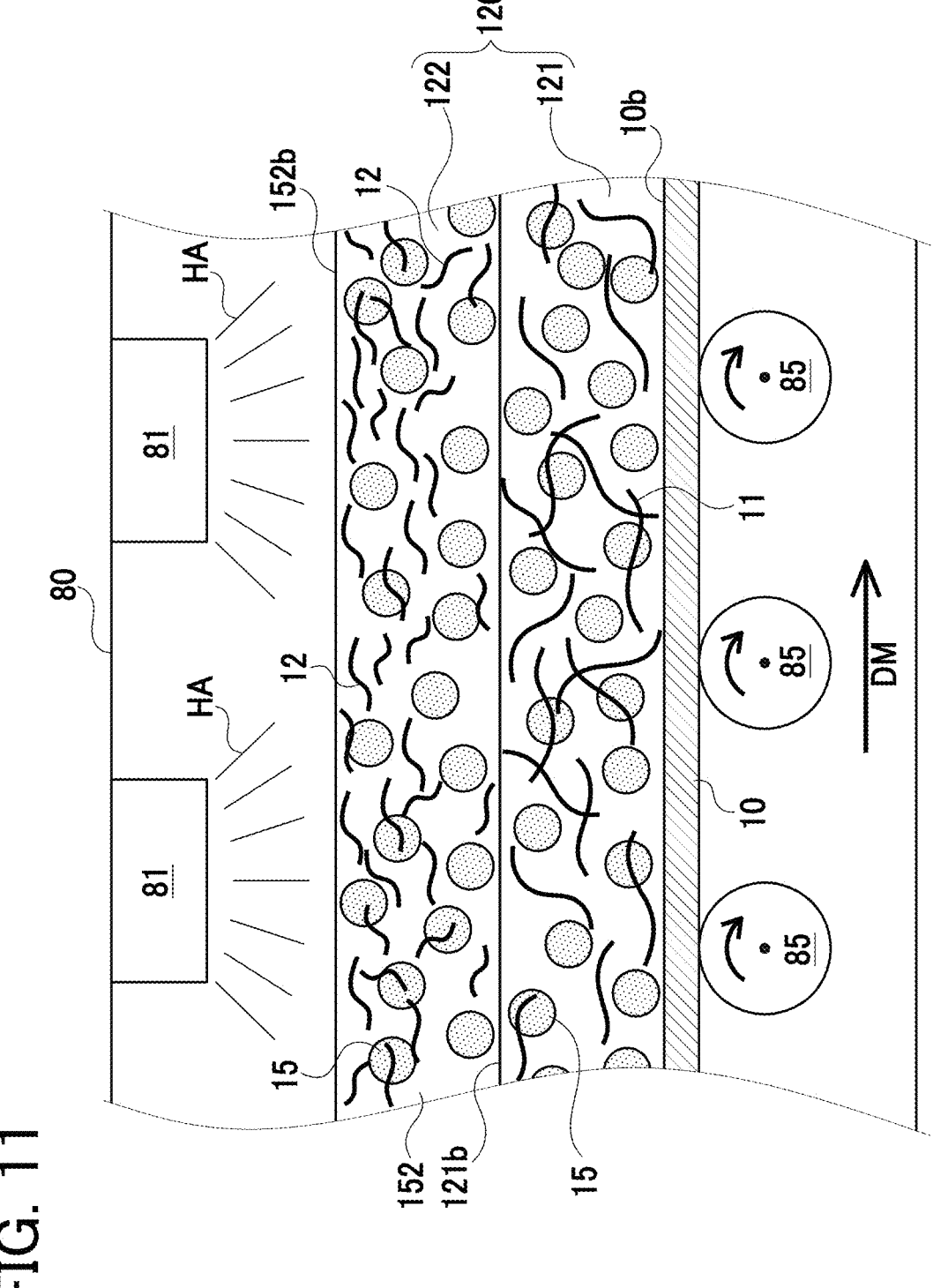
FIG. 11 is an explanatory view of a second drying step in the drying process in the example 2.

After that, in step T5 of a second coating process, the second positive electrode paste 42 is coated on a surface 121*b* of the first positive electrode mixture layer 121 to form a second positive electrode paste layer 152 (see FIG. 10). Subsequently, the process proceeds to step T6 of a second drying in which the second positive electrode paste layer 152 is dried by use of the drying furnace 80 to form a second positive electrode mixture layer 122. Thus, a positive electrode mixture layer 120 formed of the first positive electrode mixture layer 121 and the second positive electrode mixture layer 122 is formed on the first surface 10*b* of the current collector 10 (see FIG. 11).

Thereafter, the positive electrode mixture layer 120 formed of the first positive electrode mixture layer 121 and the second positive electrode mixture layer 122 is formed also on the second surface 10*c* of the current collector 10. To be specific, in step T7 of a first coating process, the first positive electrode paste 41 is coated on the second surface 10*c* of the current collector 10 to form the first positive electrode paste layer 151. Subsequently, the process proceeds to step T8 of the first drying in which the first positive electrode paste layer 151 is dried to form the first positive electrode mixture layer 121. Thereafter, in step T9 of the second coating process, the second positive electrode paste 42 is coated on a surface 121*b* of the first positive electrode mixture layer 121 to form the second positive electrode paste layer 152.

Figure 12:
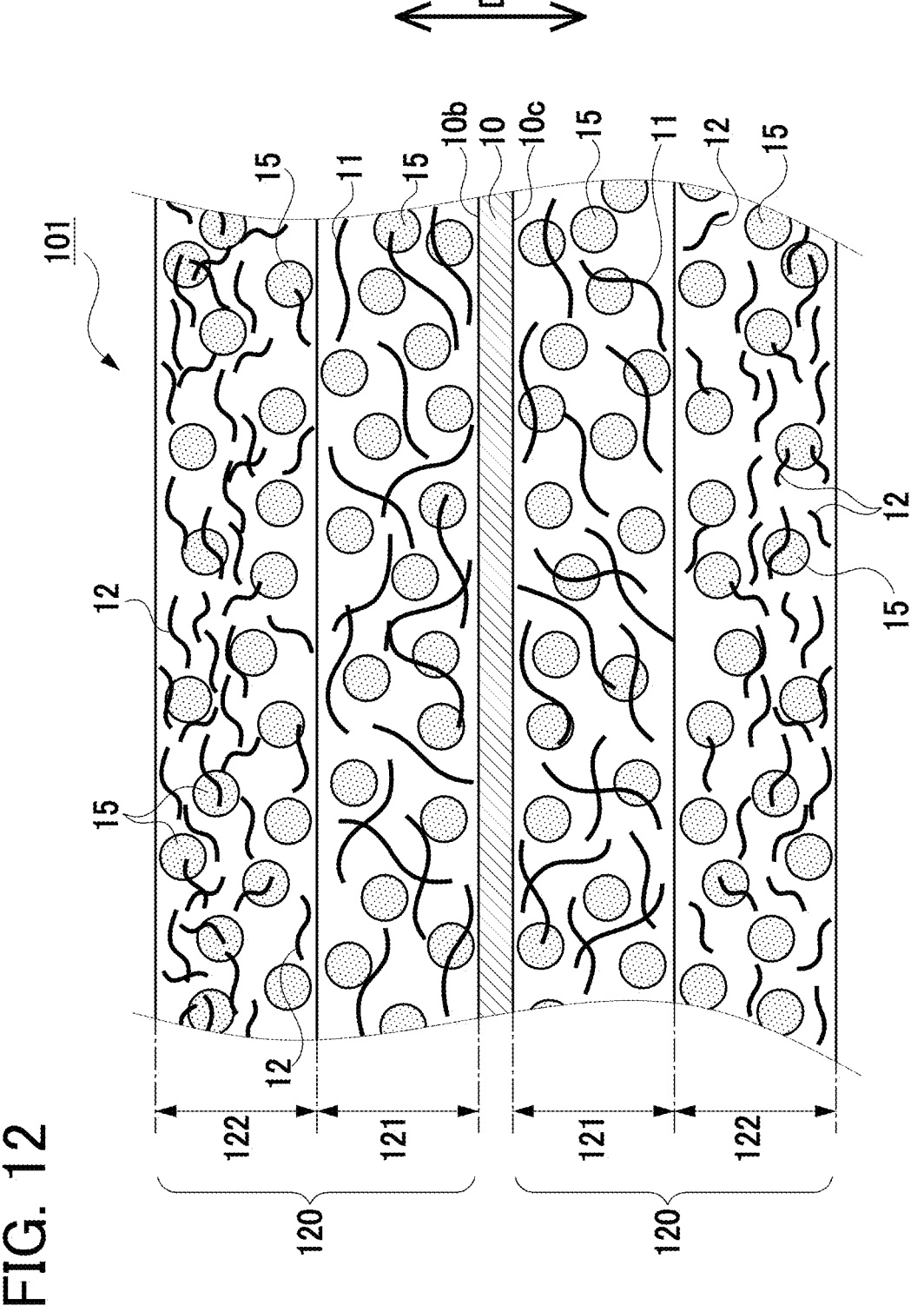
FIG. 12 is a schematic sectional view of the positive electrode plate in the example 2.

Subsequently, the process proceeds to step TA of the second drying in which the second positive electrode paste layer 152 is dried to form the second positive electrode mixture layer 122. In this manner, the positive electrode mixture layer 120 formed of the first positive electrode mixture layer 121 and the second positive electrode mixture layer 122 is formed also on the second surface 10*c* of the current collector 10 (see FIG. 12). Accordingly, a positive electrode plate 101 (that is, the positive electrode plate 101 before pressing) provided with the positive electrode mixture layers 120 on both surfaces (that is, the first surface 10*b* and the second surface 10*c*) of the current collector 10 can be obtained. Thereafter, in step TB of a press process, the positive electrode plate 101 is pressed in the thickwise direction DT to compress the positive electrode mixture layers 120 in the thickwise direction DT, thus completing the positive electrode plate 101 (see FIG. 12). Herein, step T4 of the first drying, step T6 of the second drying, step T8 of the first drying, and step TA of the second drying in the present example 2 correspond to a process of the drying.

In the present example 2, too, as similar to the example 1, the average length of the first carbon nanotubes 11 included in the first positive electrode paste 41 is arranged to be longer than the average length of the second carbon nanotubes 12 included in the second positive electrode paste 42. Thus, when the first positive electrode paste layer 151 is dried in step T4 and step T8 of the first drying, the first carbon nanotubes 11 positioned on the side of the current collector 10 in the first positive electrode paste layer 151 are hard to move to the surface 151*b* side (that is, the side spaced apart from the current collector 10 or the upper side in FIG. 9) with the solvent 17, so that the first carbon nanotubes 11 positioned on the current collector 10 side, especially, the ones contacted with the current collector 10, are hard to decrease.

Further, also in the example 2, the viscosity of the first positive electrode paste 41 is arranged to be higher than that of the second positive electrode paste 42. Thus, when the first positive electrode paste layer 151 is to be dried in step T4 and step T8 of the first drying, the first carbon nanotubes 11 positioned on the current collector 10 side in the first positive electrode paste layer 151 are further hard to move to the surface 151*b* side (that is, the side spaced apart from the current collector 10).

Therefore, according to the producing method of the present example 2, reduction in the conductive paths on the current collector 10 side in the first positive electrode mixture layer 121, in which the first positive electrode paste layer 151 has been dried, can be prevented. Thus, increase in the electrical resistivity of the positive electrode plate 101 in the thickwise direction DT can be prevented, thereby further preventing degradation in the current collecting performance of the positive electrode plate 101. Therefore, according to the producing method of the present example 2, the positive electrode plate 101 having low electrical resistivity (Ω·cm) in the thickwise direction DT can be produced.

<Comparison of Electrical Resistivity of Positive Electrode Plates in Thickwise Direction>

Figure 13:
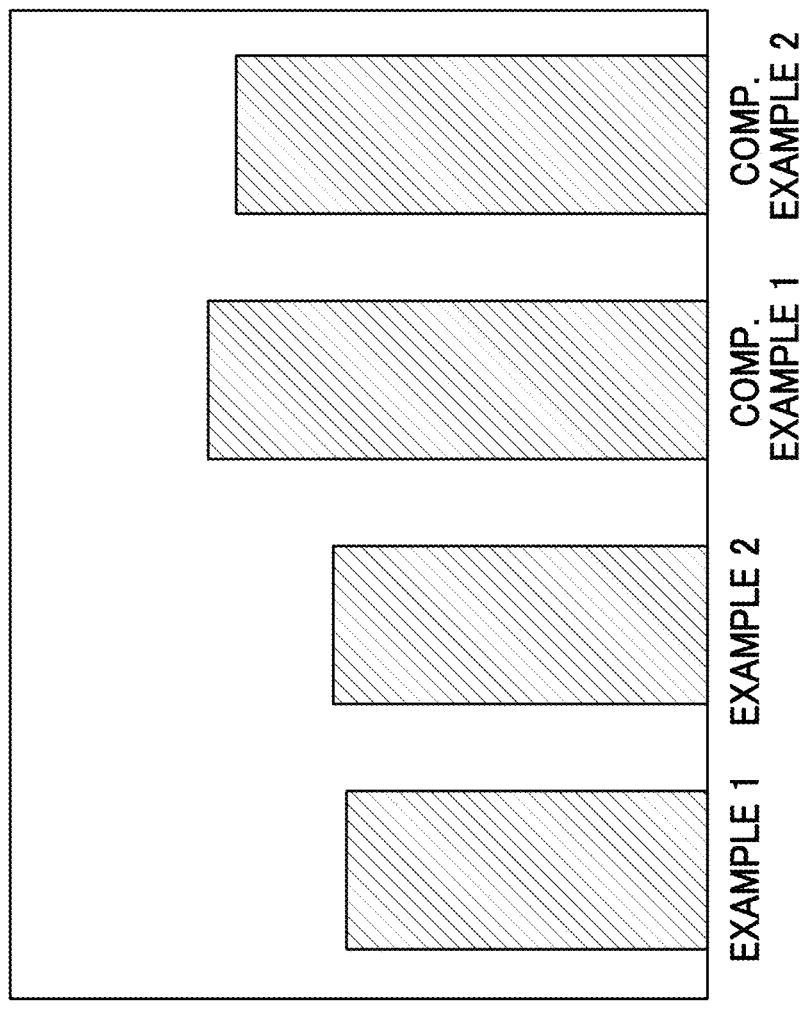
FIG. 13 is a graph for comparing electrical resistivity of the positive electrode plate in a thickwise direction.

The electrical resistivity (Ω·cm) in the thickwise direction DT is measured for the positive electrode plate 1 of the example 1 and the positive electrode plate 101 of the example 2. The measurement is made by measuring the electrical resistivity of the positive electrode plate 1 and the positive electrode plate 101 in the thickwise direction DT by a known method in a state in which a load of 3.5 kN is applied to the positive electrode plate 1 and the positive electrode plate 101 in the thickwise direction DT. Comparison of the results of this measurement is shown in FIG. 13. As a comparative example 1, a positive electrode plate only provided with the second positive electrode mixture layers 122 on the first surface 10*b* and the second surface 10*c* of the current collector 10 is produced. Namely, in the comparative example 1, the first surface 10*b* and the second surface 10*c* of the current collector 10 are coated only with the second positive electrode paste 42 including the second carbon nanotubes 12 with the short average length to produce the positive electrode plate.

Further, as a comparative example 2, a positive electrode plate having the second positive electrode mixture layers 122 disposed on the first surface 10b and the second surface 10c of the current collector 10 and having the first positive electrode mixture layers 121 disposed on the second positive electrode mixture layers 122 is produced. In this comparative example 2, on the contrary to the example 2, the first surface 10b and the second surface 10c of the current collector 10 are coated with the second positive electrode paste 42 including the second carbon nanotubes 12 with the short average length and this second positive electrode paste 42 is dried to form the second positive electrode mixture layers 122. Thereafter, the first positive electrode paste 41 is coated on the surfaces of the second positive electrode mixture layers 122 and dried to form the first positive electrode mixture layers 121. In these positive electrode plates in the comparative example 1 and the comparative example 2 their electrical resistivity in the thickwise direction are also measured as similar to the positive electrode plate 1 in the example 1 and the positive electrode plate 101 in the example 2. The results of these comparative examples are also shown in FIG. 13 for comparison.

As shown in FIG. 13, the electrical resistivity of the positive electrode plate in the thickwise direction of the example 1 and the example 2 is smaller than that of the comparative example 1 and the comparative example 2. This is because in the example 1 and the example 2, unlike the comparative example 1 and the comparative example 2, the first positive electrode paste 41 including only the first carbon nanotubes 11 having the longer average length than the second carbon nanotubes 12 as carbon nanotubes is coated on the first surface 10b and the second surface 10c of the current collector 10. Thus, when the first positive electrode paste layers 51 and 151 formed of the first positive electrode paste 41 are dried, the first carbon nanotubes 11 positioned on the current collector 10 side in the first positive electrode paste layers 51 and 151 are hard to move to the side of the surfaces 51b and 151b with the solvent 17, so that the first carbon nanotubes 11 positioned on the current collector 10 side, especially the ones contacted with the current collector 10, are rarely reduced.

To be more specific, when the first positive electrode paste layers 51 and 151 are dried, the first carbon nanotubes 11 in the first positive electrode paste layers 51 and 151 tend to move to the surface 51b side and the surface 151b side with the solvent 17 which is to be evaporated, but the first carbon nanotubes 11 each having the long length are easily caught or hooked on the positive active material particles 15 and get hard to move to the surface 51b side and the surface 151b side owing to this catching by the positive active material particles 15. Thus, it is considered that decrease in the carbon nanotubes on the side of the current collector 10 are restrained. Accordingly, it is considered that the conductive paths on the current collector 10 side in the positive electrode mixture layers 20 and 120 are preferably formed, and thereby the electrical resistivity of the positive electrode plates 1 and 101 in the thickwise direction can be made low.

On the other hand, in the comparative examples 1 and 2, the second positive electrode paste 42 including only the second carbon nanotubes 12, which have the average length shorter than the first carbon nanotubes 11 as the carbon nanotubes, is coated on the first surface 10 and the second surface 10c of the current collector 10. Accordingly, it is considered that, when the second positive electrode paste layer formed of the second positive electrode paste 42 is dried, the second carbon nanotubes 12 positioned on the current collector 10 side in the second positive electrode paste layer easily move to the surface-side with the solvent 17, so that the second carbon nanotubes 12 positioned on the current collector 10 side, especially the ones contacted with the current collector 10, are easily reduced. Therefore, it is considered that the conductive paths on the current collector 10 side in the positive electrode mixture layer are reduced, thereby increasing the electrical resistivity of the positive electrode plate in the thickwise direction.

Moreover, in comparing the results of the example 1 and the example 2, the electrical resistivity in the thickwise direction DT is lower in the example 1 than in the example 2 (see FIG. 13). The reason for this decline in the electrical resistivity is considered as below. In the example 1, in step S4 of the second coating process, the second positive electrode paste 42 is coated on the surface 51b of the first positive electrode paste layer 51 before drying, and thereafter, in step S5 of the drying process, the second positive electrode paste layer 52 is dried with the first positive electrode paste layer 51. On the other hand, in the example 2, the first positive electrode paste layer 151 is dried before coating the second positive electrode paste 42, and then the first positive electrode mixture layer 121 is formed. Thereafter, the second positive electrode paste layer 152 coated on the surface 121b of the first positive electrode mixture layer 121 is dried.

To be more specific, in the example 1 and the example 2, when the second positive electrode paste layer 52 and the second positive electrode paste layer 152 are dried, a part of the second carbon nanotubes 12 positioned on the current collector 10 side in each of the second positive electrode paste layer 52 and the second positive electrode paste layer 152 moves to the surface 52b side and the surface 152b side with the solvent 17, so that the number of the second carbon nanotubes 12 on the current collector 10 side in the second positive electrode paste layers 52 and 152 decreases.

On the other hand, in the example 1, the second positive electrode paste layer 52 is dried with the first positive electrode paste layer 51. While these layers are being dried, a part of the first carbon nanotubes 11 positioned on the surface 51b side of the first positive electrode paste layer 51 moves to the surface 52b side with the solvent 17 to be positioned on the current collector 10 side of the second positive electrode paste layer 52. Further, another part of the first carbon nanotubes 11 is positioned to bridge over the surface 51b side of the first positive electrode paste layer 51 and the current collector 10 side of the second positive electrode paste layer 52. In this manner, on the current collector 10 side in the second positive electrode paste layer 52, the first carbon nanotubes 11 are disposed to supplement at least a part of the reduced amount of the second carbon nanotubes 12. Thereby, in the example 1, the carbon nanotubes are disposed appropriately also on the current collector 10 side of the second positive electrode paste layer 52, so that the electrical resistivity of the positive electrode plate 1 in the thickwise direction DT is kept low.

On the other hand, in the example 2, when the second positive electrode paste layer 152 is dried, the first positive electrode paste layer 151 has already been dried and turned to the first positive electrode mixture layer 121, and thus the first carbon nanotubes 11 in the first positive electrode mixture layer 121 do not move to the second positive electrode paste layer 152. Therefore, when the second positive electrode paste layer 152 is dried, the number of the carbon nanotubes decreases on the current collector 10 side in the second positive electrode paste layer 152 by the amount of the second carbon nanotubes 12 that have moved to the surface 152*b* side from the current collector 10 side of the second positive electrode paste layer 152.

As explained above, the producing method of the example 1 can further lower the electrical resistivity of the positive electrode plate in the thickwise direction than the producing method of the example 2. Accordingly, the producing method for the positive electrode plate "in which the second positive electrode paste layer is formed by coating the second positive electrode paste on the surface of the first positive electrode paste layer in the second coating process and the first positive electrode paste layer is dried with the second positive electrode paste layer in the drying process" is further preferable.

The present disclosure has been explained in detail with embodiments as the examples 1 and 2 mentioned above, but the present disclosure is not limited to the above embodiments and may be applied with any appropriate modifications without departing from the scope of the disclosure.

REFERENCE SIGNS LIST

1, 101 Positive electrode plate
10 Current collector
11 First carbon nanotubes
12 Second carbon nanotubes
15 Positive active material particles
17 Solvent
20, 120 Positive electrode mixture layer
21, 121 First positive electrode mixture layer
22, 122 Second positive electrode mixture layer
41 First positive electrode paste
42 Second positive electrode paste
51, 151 First positive electrode paste layer
52, 152 Second positive electrode paste layer
80 Drying furnace

What is claimed is:

1. A producing method for a positive electrode plate comprising a positive electrode mixture layer on a surface of a current collector, the producing method comprising:
first-positive-electrode-paste preparing of preparing a first positive electrode paste including first carbon nanotubes, positive active material particles, and a solvent;
second-positive electrode-paste preparing of preparing a second positive electrode paste including second carbon nanotubes, the positive active material particles, and the solvent;
first coating of coating the first positive electrode paste on the surface of the current collector to form a first positive electrode paste layer on the surface of the current collector;
second coating of coating the second positive electrode paste on any one of a surface of the first positive electrode paste layer or a surface of a first positive electrode mixture layer which is formed by drying the first positive electrode paste layer to form a second positive electrode paste layer; and
any one of

12 drying the first positive electrode paste layer ad the second positive electrode paste layer after the second coating to form the positive electrode mixture layer, or
drying including steps of first drying of the first positive electrode paste before the second coating to form the first positive electrode mixture layer and second drying of the second positive electrode paste layer, which has been coated on the surface of the first positive electrode mixture layer, to form the positive electrode mixture layer, wherein
a length of each of the first carbon nanotubes is within a range of 1.0 μm to 3.0 μm, and a length of each of the second carbon nanotubes is within a range of 0.3 μm to 0.8 μm, wherein
the first positive electrode paste includes the first carbon nanotubes, without including the second carbon nanotubes, and
the second positive electrode paste includes the second carbon nanotubes, without including the first carbon nanotubes.

2. The producing method for the positive electrode plate according to claim 1, wherein
the second coating includes coating the second positive electrode paste on a surface of the first positive electrode paste layer to form the second positive electrode paste layer,
the producing method comprises the drying the first positive electrode paste layer and the second positive electrode paste layer after the second coating to form the positive electrode mixture layer, and
the drying the first positive electrode paste layer and the second positive electrode paste layer is to dry the first positive electrode paste layer with the second positive electrode paste layer.

3. The producing method for the positive electrode plate according to claim 1, wherein
in the second coating, the second positive electrode paste is coated on the surface of the first positive electrode paste layer.

4. The producing method for the positive electrode plate according to claim 1, wherein
in the second coating, the second positive electrode paste is coated on the surface of the first positive electrode mixture layer.

5. The producing method for the positive electrode plate according to claim 1, wherein the producing method comprises the drying including the steps of
the first drying of the first positive electrode paste layer before the second coating to form the first positive electrode mixture layer, and
the second drying of the second positive electrode paste layer, which has been coated on the surface of the first positive electrode mixture layer, to form the positive electrode mixture layer.

6. The producing method for the positive electrode plate according to claim 1, wherein the producing method comprises the drying the first positive electrode paste layer and the second positive electrode paste layer after the second coating to form the positive electrode mixture layer.

7. The producing method for the positive electrode plate according to claim 1, wherein
a viscosity of the first positive electrode paste is higher than a viscosity of the second positive electrode paste.

* * * * *